United States Patent [19]
Ruedin et al.

[11] Patent Number: 6,004,423
[45] Date of Patent: Dec. 21, 1999

[54] MANUFACTURING METHOD FOR A BATCH OF LAMINATED CELLS AND LAMINATED CELLS THEREBY OBTAINED

[75] Inventors: Yves Ruedin; Michel Sallin, both of St-Blaise, Switzerland

[73] Assignee: Asulab S.A., Bienne, Switzerland

[21] Appl. No.: 09/104,207

[22] Filed: Jun. 25, 1998

[30] Foreign Application Priority Data

Jul. 7, 1997 [CH] Switzerland .............................. 97 1641

[51] Int. Cl.$^6$ .................................................. B32B 31/00
[52] U.S. Cl. .......................................... 156/292; 349/157
[58] Field of Search ....................... 156/292, 99; 349/155

[56] References Cited

U.S. PATENT DOCUMENTS

| | | | |
|---|---|---|---|
| 3,912,365 | 10/1975 | Lowell | 359/296 |
| 4,626,073 | 12/1986 | Amstutz et al. | 349/155 |
| 5,464,490 | 11/1995 | Sato et al. | 156/145 |
| 5,581,384 | 12/1996 | Hotta et al. | 349/155 |

OTHER PUBLICATIONS

Database WPI Section PQ, Week 9638, Derwent Publications Ltd., London, GB; Class P81, AN–96–380231 XP 002049478 & JP 08184840A (Casio Computer Co. Ltd.), Jul. 16, 1996.

Patent Abstract of Japan, vol. 096 No. 004, April 30, 1996 & JP 07 318955 A (Mitsubishi Electric Corp. et al.) Dec. 8, 1995.

Patent Abstract of Japan vol. 011 No. 049(P–547), Feb. 14, 1987 & JP 61 217018 A (Sharp Corp.) Sep. 26, 1986.

*Primary Examiner*—Francis J. Lorin
*Attorney, Agent, or Firm*—Griffin, Butler, Whisenhunt & Szipl, LLP

[57] ABSTRACT

The batch manufacturing of laminated cells whose spacing is kept constant by means of spacers (11) of diameter $\underline{d}$, comprises the steps of forming a first line on a substrate (1), with a hot melt adhesive material for the sealing frames (3) and junction portions (5) between the holes (6) of spacing $\underline{e}$ and a second line (7) closed at one end (8) to create a filling channel (9), said lines having a constant cross-section So and a height h; depositing the spacers (11) over the substrate (1) and close to the holes (6), destructible or deformable spacers (12) of diameter D such that h>D>d; sealing a second flat deformable substrate (2) with a reduced application of pressure above the holes (6); filling all the cells; exerting a second pressure equal to or greater than the first and heating the zones above the holes to a temperature equal to or greater than that of the hot melt adhesive material; and cutting out each cell.

12 Claims, 2 Drawing Sheets

MANUFACTURING METHOD FOR A BATCH OF LAMINATED CELLS AND LAMINATED CELLS THEREBY OBTAINED

FIELD OF THE INVENTION

The present invention concerns a manufacturing method for a batch of laminated cells and the cells thereby obtained after they have been separated from each other from a common flat substrate having been used for the manufacture thereof.

More particularly, the invention concerns a method allowing the manufacture of laminated cells in batches to be made simpler, and thus more economical, more particularly as regards the sealing step after simultaneous filling of all the cells of a same batch with an active liquid material.

The invention also concerns the laminated cells thereby obtained after they have been individually separated from the manufacturing batch.

BACKGROUND OF THE INVENTION

Within the present invention, <<laminated cells>> means any sealed structure formed of two plates at least one of which is transparent, the space thereby delimited being filled with a liquid, said liquid being generally an active material, as is the case in liquid crystal display cells or in photoelectrochemical cells. When these laminated cells are of small dimensions, it is economically advantageous to manufacture them, not by the unit, but in batches from a common substrate, then to cut them to subsequently use them individually in the equipment for which they are intended.

In order to manufacture a laminated cell, the method basically consists in depositing on a first plate, for example made of glass, a sealing frame, for example in the form of a line made of an adhesive material, arranging a filling hole in the frame, then bonding a second plate onto the frame via application of pressure or by heating the entire surface, the space between the two plates being kept constant by rigid spacers (glass balls or rods) deposited within the frame.

The liquid material is introduced into the enclosure by suction after having previously made vacuum in the enclosure. Certain methods are proposed for filling several cells in a single operation, either by stacking them, or by cutting out of the batch a strip of cells with all their holes aligned. In both cases, the last manufacturing step always requires individual treatment of the cells for insertion of the sealing plugs, generally formed of a different material to that used for manufacturing the frame.

In JP Patent Application No. 61-217018, the method described allows filling of four cells arranged in a star to be effected at one time, the filling holes being directed towards the centre where a hole has been made in one of the plates to allow the active liquid material to be introduced, said hole being subsequently sealed by a plug. This method has the drawback of requiring an additional machining operation and remains limited as regards the number of cells able to obtained with a simple geometrical shape.

SUMMARY OF THE INVENTION

The present invention concerns a manufacturing method allowing a greater number of cells to be manufactured, having only one operation to be performed to seal all the cells, i.e. having a substantial advantage as regards the cost of each cell.

The invention thus concerns a manufacturing method for a batch of laminated cells able to be separated from each other, each cell being formed by a lower plate bonded to an upper plate via a sealing frame, the space between the two plates being kept constant by means of first rigid spacers of diameter $d$, the sealing frame of each cell being provided with an hole of spacing e having to be sealed after filling with an active liquid material, characterised in that it includes the steps consisting in:

forming, on a first substrate, with a hot melt adhesive material a first line following the line of the frames of at least one series of cells, the holes being connected to each other by junction portions, then a second line substantially parallel to said junction portions and attached to the first line by one of its ends to form a filling channel, said first and second lines having a substantially uniform cross-section So and an initial height h;

uniformly depositing over the entire first substrate the first rigid spacers of diameter $d$ and only in the proximity of the holes, second rigid but destructible or deformable spacers of diameter D such that h>D>d;

applying on the assembly thereby formed a second deformable flat substrate, and, with a first tool, exerting a first pressure and heating to the softening temperature of the hot melt adhesive material of the lines over the entire surface to bring the height of said lines to a value substantially close to $d$, with the exception of the portions close to the holes kept at a distance D by the second spacers, the cross-section So of said lines having been selected so that the plastic flow of the hot melt adhesive material does not completely seal the holes;

filling all the cells with the active liquid material by means of the filling channel;

with a second tool exerting a second pressure substantially greater than the first and heating to a temperature at least equal to the first over the zones situated above the holes, to bring the height of the lines to a value equal to d, the cross-section So of said lines having been selected so that the plastic flow of the hot melt adhesive material during this second application of pressure completely seals the holes; and separating each cell from the manufacturing batch by cutting.

The line deposited over the first substrate does not generally need to have a cross-section of well defined geometrical shape, but for purposes of convenience for the remainder of the description, it will be assumed that it has a rectangular cross-section of width $l$ and that the hot melt adhesive material of which it is formed is deformable in an isotropic manner when pressure is exerted thereon.

In this case, it can easily be shown that initial spacing of the holes to be filled with active liquid material must be such that $$\frac{l(h-d)}{d} > e > \frac{l(h-D)}{D}$$

The respective values of h, D and d can be selected in any way provided that the ratio h>D>d is respected. According to a preferred embodiment, $h \leq 1.2D$ and $D \leq 1.5d$ are selected.

The cells may have a priori any shape or arrangement, but they are generally a simple rectangular or circular geometrical shape. When the cells are rectangular, their holes are on a same alignment and the second line used to form the filling channel is then parallel to the alignment of the holes. When the cells are circular, the filling channel can have an undulated shape if the rows of cells are arranged in a quincunx to use the entire substrate surface area in the best way possible. The second line can also be formed like the first, the holes of all the cells then opening out into a central channel forming the filling channel. It will also be noted that the same substrate can carry several simple or double alignments of cells, the openings of the filling channels being then oriented in the same direction. Thus, with a glass sheet having for example the dimensions 177.8×177.8 mm, it is possible to manufacture a large number of cells while having to perform only one filling operation and in particular, only one sealing operation.

The spacers of dimension $\underline{d}$, intended to keep the distance between the two plates constant, are generally formed by glass balls or rods, and the pressure exerted during assembly is controlled so as not to break said spacers. The spacers of dimension D, located in proximity to the holes, are made of a material having a pressure resistance at least equal to that of the spacers of dimension d, but able to be broken when the second application of pressure, preferably located at the place where the spacers of diameter D are situated, is given a value greater than the first.

By controlling the temperature parameter, it is possible to select, for the spacers of dimension D, a material which will not be affected by the temperature applied during the first application of pressure, but which will be deformed by exerting locally the second application of pressure at a higher temperature than the first. These second spacers are for example made of another hot melt adhesive material having a higher softening point than the hot melt adhesive material of the sealing frames. There is a very wide range of hot melt adhesive materials on the market, from among which it is possible to select two compounds whose softening points differ by at least 30° C.

The second spacers arranged in proximity to the holes must preferably be outside the frames and can be placed, for example, either within the filling channel, or outside the space formed by the frames and the filling channel. In order to keep said spacers at the desired location, they can be incorporated in a paste.

As is seen, the method according to the invention requires the use of two tools allowing the pressure and temperature applied to be controlled. It is necessary, in particular, for the first tool to include means allowing different thicknesses to be obtained, according to the type of spacers or according to different zones of the substrate.

BRIEF DESCRIPTION OF THE DRAWINGS

Other features and advantages of the present invention will appear upon reading the following description of an implementation of the method, given by way of example, with reference to the annexed drawings in which.

DETAILED DESCRIPTION OF THE INVENTION

Figure 1:
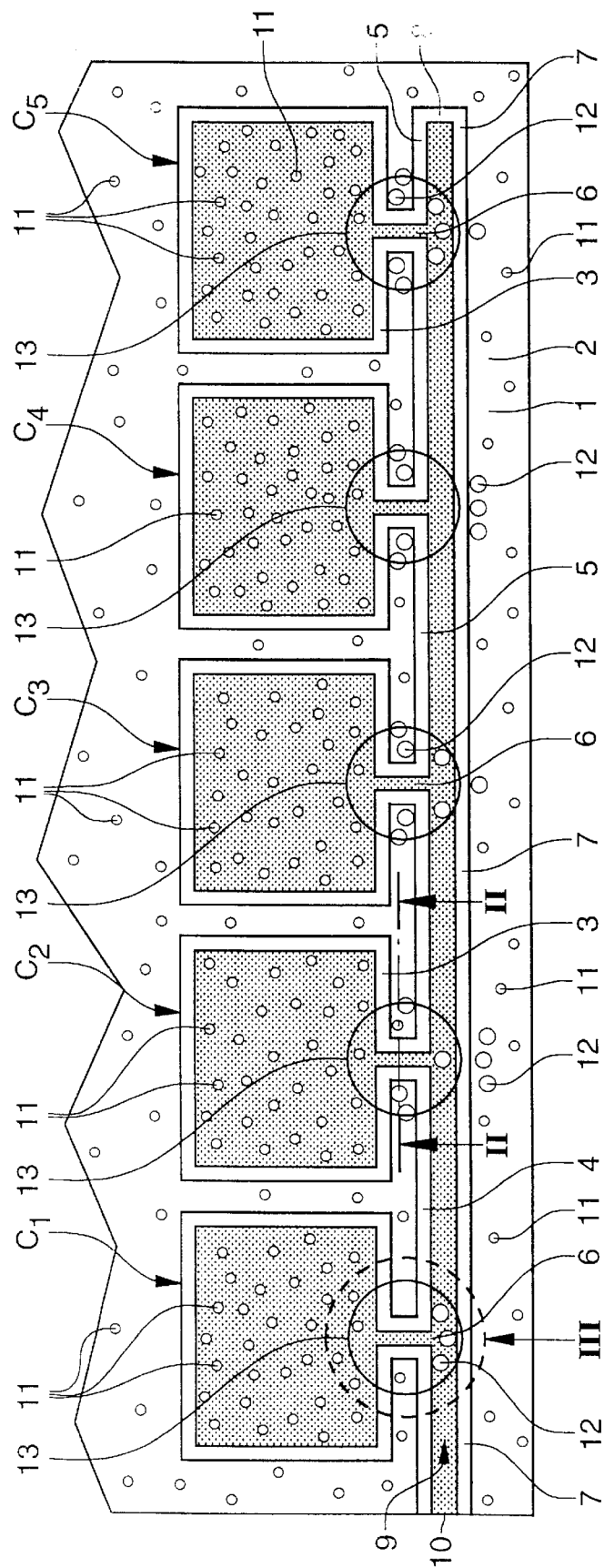
FIG. 1 is a top view of a series of cells in a manufacturing batch.
Figure 3:
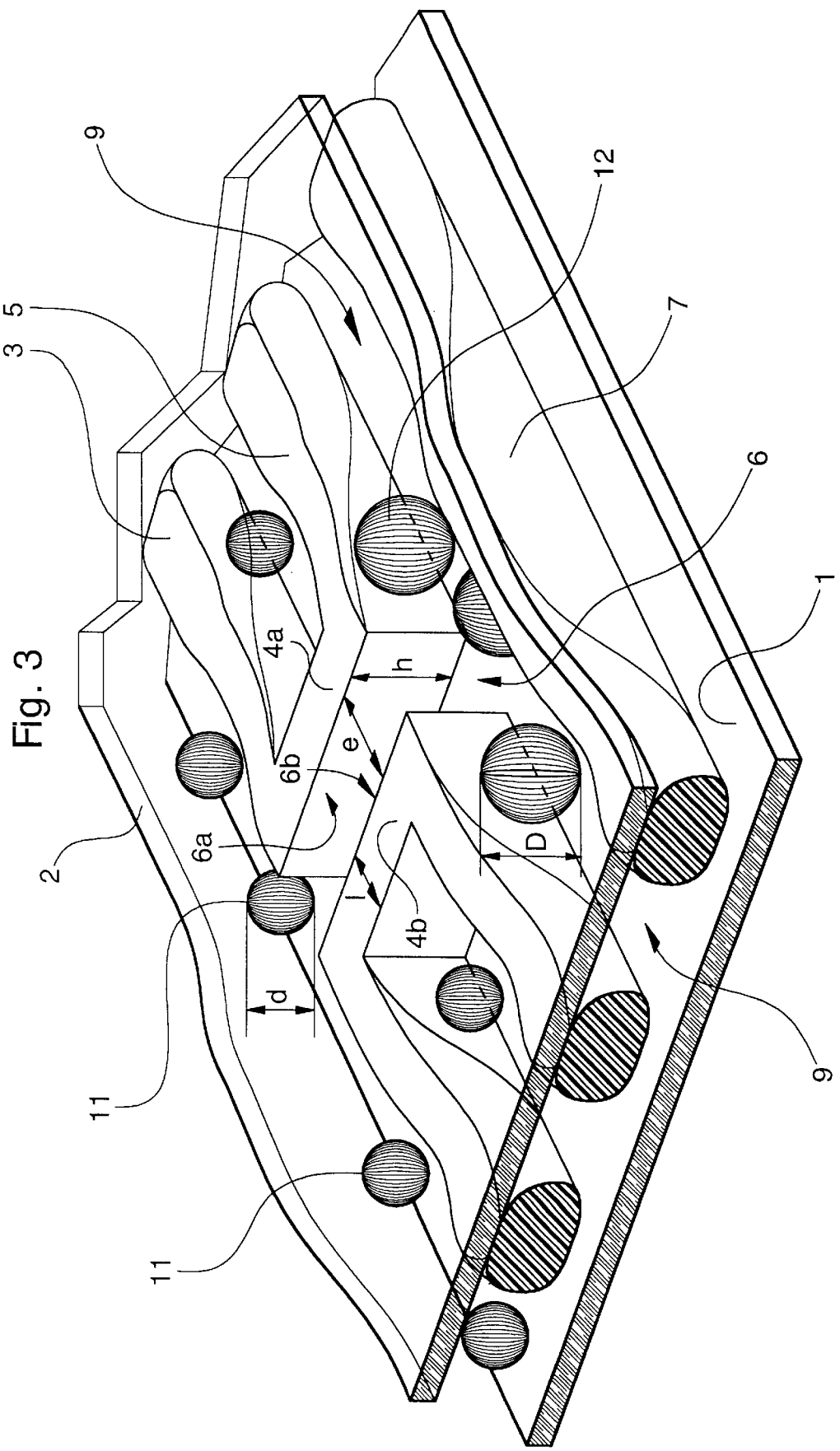

FIG. 3 is an enlarged perspective view of zone III of FIG. 1 prior to the cell sealing step.

FIGS. 1 and 3 show a series of five cells $C_1$ to $C_5$, all identical, of rectangular shape and whose frames 3 formed by a same first line are disposed over a common substrate 1 formed by a thin glass plate having a thickness of approximately 0.3 mm. Frames 3 are provided with holes 6 of spacing $\underline{e}$, said holes being extended by channels formed by portions 4$a$ and 4$b$ of the first line and being connected to each other by junction portions 5 forming with frames 3 a continuous line. This line is formed of a hot melt adhesive material of substantially constant cross-section So, deposited by heat extrusion with a thickness $\underline{h}$. As hot melt adhesive material, the product Surlyn AD-2® available from Du Pont and having a softening point of 92° C. will for example be selected. Likewise, a second line 7 is provided, substantially parallel to junction portions 5 and attached to first line 3, 4$a$, 4$b$, 5 by its end 8 to form a filling channel 9 into which holes 6 of cells $C_1$ to $C_5$ open out and whose single opening 10 is situated on the edge of substrate 1. The lines have for example a height $\underline{h}$=30 $\mu$m, a width l=200 $\mu$m and the holes have a spacing $\underline{e}$ of the order of 300 $\mu$m.

First spacers 11, formed by glass balls of diameter $\underline{d}$ are then deposited all over substrate 1. Equally, rods of diameter $\underline{d}$ could also be used. Second spacers 12 formed by spheres of diameter D are then deposited on the exterior of the frames and in proximity to holes 6. These second spacers 12 are shown in filling channel 9 for cell C1. For cell C3, they are shown on the exterior of the filling channel. In order to have rigid but destructible spacers, glass balls will for example be used. In order to have rigid but heat deformable spacers, another hot melt adhesive material having a higher softening point than that of the material of the frame will for example be used. In the example described, the product Polybond 1009® available from Uniroyal and having a softening point of 122° C. could be selected. In order to keep these second spacers 12 in the desired place during the entire manufacturing process, they can be incorporated in a paste. The small spacers 11 have for example a diameter d=10 $\mu$m and the large spacers a diameter D=20 $\mu$m, so that D≦1.5d and h≦1.2D. This step of the method is shown schematically in FIG. 2$a$.

Figures 2A, 2B, 2C:
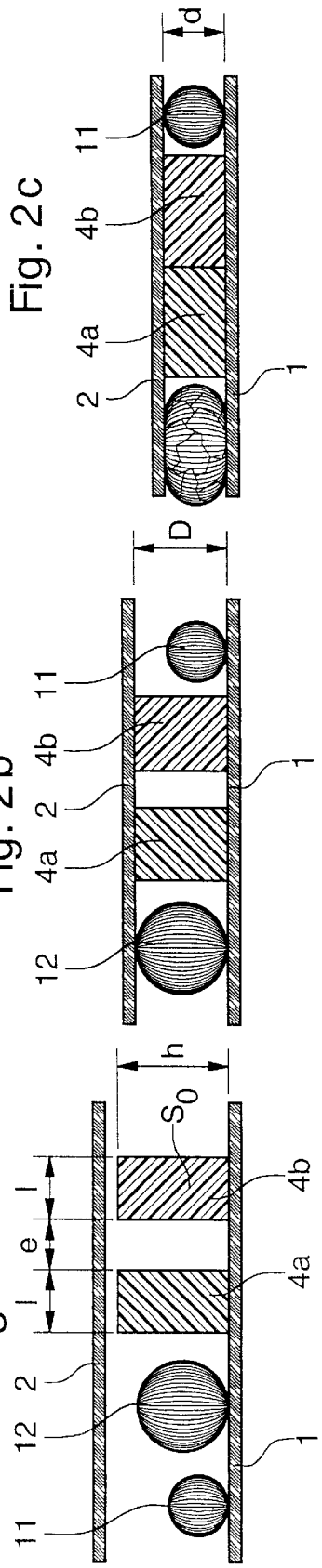
FIGS. 2$a$, b 2$b$ and 2$c$ show cross-sectional view along line II—II of FIG. 1, each representing different steps of the manufacturing method.

In the following step, a second flat deformable substrate 2 is applied over the structure thus formed, for example another glass plate having a thickness of 0.3 mm, or a semi-rigid plastic material, then pressure is exerted while heating the hot melt adhesive material of the frame to its softening temperature by means for example of a flat metal tool including recesses at zones 13 situated above holes 6 of each cell. Via the effect of the pressure and heating, initial thickness h of the lines is brought along its entire length to a value close to $\underline{d}$, except at holes 6 kept open by spacers 12 of thickness D as is shown in FIG. 2. In accordance with known means, the pressure can be controlled to the moment when the inner face of second substrate 2 is most in contact with spacers 11 of thickness d, the pressure then being released after implementation of cooling means. In this step of the method, the hot melt adhesive material has yielded, causing shrinkage of holes 6, without however completely sealing them, as is shown schematically in FIG. 2$b$. A space formed by the enclosures of cells C1 to C5 and filling channel 9 has thus been created, which only communicates with the exterior by means of opening 10.

The active liquid material is then introduced through opening 10 in accordance with one of the known methods for filling a single cell.

The next step, schematically shown in FIG. 2$c$, allows all the cells to be sealed at once. For this purpose, a second tool whose temperature and pressure can be controlled is applied to zones 13 situated above holes 6. When second spacers 12 are destructible, the temperature of the tool is adjusted to the softening point of hot melt adhesive material of the lines and the pressure exerted is greater than the breaking pressure of second spacers 12, said pressure being released after cooling when zone 13 of the inner face of the second substrate comes into contact with spacers 11. When second spacers 12 are heat deformable, the temperature of the tool above zone 13 is adjusted to the softening temperature of the material of which said second spacers are manufactured, the pressure being released after cooling as previously indicated. In both cases, the sealing of each cell is obtained by the yielding of walls 6a and 6b facing the line forming a channel at each hole 6. If one assumes that this deformation is isotropic, the total desired sealing will be obtained by giving the channel a width whose theoretical upper and lower limits can be calculated, as previously indicated.

The final step consists in cutting out the completed cells in accordance with known methods by following the external contour of each frame.

As was indicated in the beginning, second line 7 could also include the filling holes of a second series of cells.

Likewise, a manufacturing batch can include several filling channels for simple or double series of cells, the openings of all the filling channels being aligned on a same edge of substrate 1.

As a result of this manufacturing method, the laminated cells thereby obtained are characterised in that the means for sealing the filling holes is not an added plug, but the frame material itself after yielding.

What is claimed is:

1. A manufacturing method for a batch of laminated cells able to be separated from each other, each cell being formed by a lower plate bonded to an upper plate via a sealing frame, the space between the two plates being kept constant by means of first rigid spacers of diameter $d$, the sealing frame of each cell being provided with an hole of spacing $e$ having to be sealed after being filled with an active liquid material, wherein it includes the steps consisting in:

forming with a hot melt adhesive material on a first substrate, a first line following the line of the frames of at least one series of cells, the holes being connected to each other by junction portions, then a second line substantially parallel to said junction portions and attached to the first line by one of its ends to form a filling channel, said first and second lines having a substantially uniform cross-section So and an initial height h;

uniformly depositing over the entire first substrate the first rigid spacers of diameter $d$ and only in the proximity of the holes, second rigid but destructible or deformable spacers of diameter D such that h>D>d;

applying on the assembly thereby formed a second deformable flat substrate, and, with a first tool, exerting a first pressure and heating to the softening temperature of the hot melt adhesive material of the lines over the entire surface to bring the height of said lines to a value substantially close to $d$, with the exception of the portions close to the holes kept at a distance D by the second spacers, the cross-section So of said lines having been selected so that the plastic flow of the hot melt adhesive material does not completely seal the holes;

filling all the cells with the active liquid material by means of the filling channel;

with a second tool exerting a second pressure substantially greater than the first pressure and heating to a temperature at least equal to the first over the zones situated above the holes, to bring the height of the lines to a value equal to $d$, the cross-section So of said lines having been selected so that the plastic flow of the hot melt adhesive material to the thickness $d$ during this second application of pressure completely seals the holes; and separating each cell from the manufacturing batch by cutting.

2. A manufacturing method according to claim 1, wherein the lines have a rectangular or square cross-section So of width $l$ and in that the initial spacing $e$ of the holes has to be such that $$\frac{l(h-d)}{d} > e > \frac{l(h-D)}{D}$$

3. A manufacturing method according to claim 1, wherein $h \leq 1.2$ D and $D \leq 1.5$ d.

4. A manufacturing method according to claim 1, wherein the second line of hot melt adhesive material is formed like the first line for another series of cells, the holes of all the cells opening out into the filling channel situated in a median position.

5. A manufacturing method according to claim 1, wherein a same manufacturing batch includes several simple or double series of cells.

6. A manufacturing method according to claim 1, wherein the second spacers of diameter D are made of a rigid material having a resistance such that said second spacers resist the first application of pressure, but are broken by the second application of pressure of greater value.

7. A manufacturing method according to claim 6, wherein in that the first and second spacers are made of the same material and in that the second application of pressure is stopped when the spacing between the first and second substrate has the value $d$.

8. A manufacturing method according to claim 1, wherein the second spacers are made of a rigid material able to be deformed when the second application of pressure has a value greater than the first pressure.

9. A manufacturing method according to claim 8, wherein the material used for the second spacers is a hot melt adhesive material having a higher softening point than that of the hot melt adhesive material used for the two lines, and in that the temperature applied during the second application of pressure is higher than that of the first application of pressure.

10. A manufacturing method according to claim 1, wherein the second spacers are incorporated in a paste.

11. A manufacturing method according to claim 1, wherein the first tool includes recesses having the same distribution as the holes of the cells in the manufacturing batch.

12. A laminated cell obtained according to the method of claim 1, wherein the filling hole is sealed by the plastic flow of the hot melt adhesive material forming the frame of said cell.

* * * * *